Patented Mar. 7, 1950

2,499,918

UNITED STATES PATENT OFFICE 2,499,918

PRODUCTION OF XYLIDINE

Augustus S. Houghton, Rivervale, N. J., and Ford R. Lowdermilk, Philadelphia, Pa., assignors to Allied Chemical & Dye Corporation, New York, N. Y., a corporation of New York No Drawing. Application April 17, 1946, Serial No. 662,925

3 Claims. (Cl. 260—580)

The invention described herein is subject to a license of this date to the Government of the United States.

This invention relates to recovery of xylidines produced upon hydrogenation of nitroxylenes.

Xylidines are generally produced by catalytic hydrogenation of nitroxylenes whereby mixtures of xylidines with water, formed as a byproduct, are obtained. Particularly advantageous methods of carrying out hydrogenation of nitroxylenes are disclosed and claimed in co-pending application Serial No. 556,774, filed by W. O. Teeters October 2, 1944, describing a process in which nitroxylenes are hydrogenated in the vapor phase in contact with a copper chromium oxide catalyst at superatmospheric pressures and at temperatures of at least 225° C.; and in co-pending application Serial No. 580,250, filed by A. S. Houghton and F. A. Sabia February 28, 1945, but now abandoned, describing a process which involves passing a gaseous mixture of nitroxylene vapor and excess hydrogen into contact with a nickel catalyst at a pressure of at least 5 atmospheres and a temperature in the range of 200° to 400° C. Recovery of xylidines produced by such hydrogenation processes has previously been accomplished by cooling the reaction products to approximately atmospheric temperatures, whereby the xylidine, together with the water concurrently produced, condenses, forming a xylidine layer and an aqueous layer; the aqueous layer is then separated from the xylidine layer and the latter distilled to remove aqueous impurities therefrom. Such procedure, however, in order to produce a xylidine product of satisfactory commercial purity, i. e. a product containing not more than 1.0% water, requires that the xylidine layer separated from the water layer be distilled, since the xylidine layer recovered directly from the condensate has been found to contain 3% or more water by weight; obviously the necessity for distilling the xylidine layer to produce a product of satisfactory purity adds considerable expense to production of the xylidine.

It is an object of this invention to provide a process whereby nitroxylenes may be hydrogenated to xylides so that the bulk of the xylidine product is recovered as a product of satisfactory commercial purity, without the necessity of subjecting the xylidine to fractionation.

In accordance with this invention a nitroxylene is hydrogenated in the vapor phase to the corresponding xylidine by passing a mixture containing the nitroxylene and hydrogen into contact with a catalyst until at least 98% of the nitroxylene has been converted to the xylidine; the mixture of xylidine, water vapor and excess hydrogen thus produced is then cooled under controlled conditions to a temperature within the range of about 10° to about 40° C. above the dewpoint of the water in the mixture. By cooling the xylidine-water-hydrogen mixture under such carefully controlled conditions, we have found, a xylidine product condenses containing less than 1%, generally less than 0.5%, water, which product is of satisfactory commercial purity, and represents the bulk, e. g. as high as 70%, of the xylidine in the product gases. The uncondensed gases may then be cooled to room temperature in accordance with conventional procedure, and the xylidine layer separated therefrom and distilled in the usual manner to recover the remaining xylidine in substantially pure form. It will be evident, therefore, the process of this invention permits substantial economies in the production of xylidine to be effected, since a product of satisfactory commercial purity may be obtained without distilling the bulk of the xylidine produced to remove water therefrom.

In carrying out the process of our invention hydrogenation of nitroxylenes to xylidines may be carried out in any suitable manner, preferably in accordance with the processes of the Teeters or Houghton and Sabia applications above referred to; the nitroxylene employed in the hydrogenation should be substantially pure. Thus, hydrogenation of the nitroxylene may desirably be carried out by passing a mixture of nitroxylene and hydrogen containing 7 to 20 cu. ft. of hydrogen (measured at the working pressure and atmospheric temperature) per pound of nitroxylene in contact with a suitable nickel or copper chromium oxide catalyst at pressures between about 10 and about 20 atmospheres gauge and temperatures between about 245° and about 360° C. Hydrogenation of the nitroxylene should be carried to a point such that at least 98% of the nitroxylene is converted to xylidine, thereby producing a product containing no more than about 1% unconverted nitroxylene.

The product produced upon hydrogenation of the nitroxylene contains the xylidine, water vapor and excess hydrogen, the water vapor being present in amounts corresponding to approximately 2 mols thereof per mol of xylidine; the amount of excess hydrogen present in the mixture may vary considerably, but generally between about 40 and about 60 mols of hydrogen per mol of xylidine are present when hydrogenation is carried out in accordance with the preferred conditions above specified. This mixture is at the pressure and temperature of the reactor, which, as above noted, may be between 10 and 20 atmospheres gauge and between 245° and 360° C. This mixture, in accordance with the invention, is then cooled to a temperature between about 10° and about 40° C., preferably between about 30° and about 40° C., above the dewpoint of the water in the mixture, i. e. the temperature at which water at the partial pressure thereof in the reaction mixture produced would condense if other condensable gases were not present. This temperature may be determined by reference to standard tables giving the dewpoint of water at its partial pressure in the mixture under consideration, which partial pressure may be readily calculated from the amounts of reactants used and the degree of hydrogenation of the nitroxylene. The cooling may be carried out at the same pressure as that at which the reaction gases come from the hydrogenator, or, if desired, the pressure on the mixture may be released and cooling thereof carried out at atmospheric pressure. The particular temperatures to which the reaction product from the hydrogenation process is cooled, thus depends upon the dewpoint of the water in the gaseous mixture; when carrying out the hydrogenation in accordance with the preferred procedures above described, the dewpoint of the water in the gaseous products obtained may vary between about 70° and about 90° C., so that in these instances the temperature to which the mixture is cooled in accordance with this invention may vary between about 80° and about 130° C., depending upon the dewpoint of the water in the particular mixture treated. Upon cooling the gaseous mixture as above described, it will be found the bulk of the xylidine contained in the product condenses containing less than 1% water by weight as impurity; if, as is preferred, cooling is carried out at a temperature between about 30° and about 40° C. above the dewpoint of the water in the mixture, the xylidine condensate will contain less than 0.5%, e. g. 0.1% to 0.3%, water by weight. Such products are acceptable as commercially pure xylidine.

After cooling of the gaseous mixture in accordance with the procedure above described, the uncondensed gases may then be permitted to cool to room temperature, whereby condensation of the remainder of the xylidine, together with the bulk of the water vapor, occurs. The xylidine phase may be separated and distilled in the usual fashion to recover the remainder of the xylidine product.

The following examples are illustrative of our invention:

*Example 1*

Nitroxylene was hydrogenated to xylidine by passing a mixture of nitroxylene and hydrogen, containing 11.0 cu. ft. of hydrogen per pound of nitroxylene, into contact with a pumice-supported nickel catalyst comprising about 20% nickel oxides at a pressure of 150 lbs. per sq. in. gauge and a temperature of 260° C., the hydrogen volume being measured at the pressure of the system and at atmospheric temperature. The resulting product was found to contain, per mol of xylidine, 43 mols of hydrogen and 2 mols of water; the dewpoint of the water in the gas was 81° C. This product was cooled to a temperature of 100° C., whereby a condensate containing 98.2% xylidine and only 0.1% water was obtained, the xylidine recovered amounting to 65.5% of the total xylidine produced.

*Example 2*

Nitroxylene was hydrogenated to xylidine by passing a mixture of nitroxylene and hydrogen, containing 12.54 cu. ft. of hydrogen per pound of nitroxylene, into contact with a pumice-supported nickel catalyst comprising about 20% nickel oxides at a pressure of 150 lbs. per sq. in. gauge and a temperature of 290° C., the hydrogen volume being measured at the pressure of the system and at atmospheric temperature. The resulting product was found to contain, per mol of xylidine, 49.4 mols of hydrogen and 2 mols of water; the dewpoint of the water in the gas was 78° C. This product was cooled to a temperature of 110° C. whereby a condensate containing 98.1% xylidine and only 0.2% water was obtained, the xylidine recovered amounting to 54.5% of the total xylidine produced.

*Example 3*

Nitroxylene was hydrogenated to xylidine by passing a mixture of nitroxylene and hydrogen, containing 14.85 cu. ft. of hydrogen per pound of nitroxylene, into contact with a pumice-supported nickel catalyst comprising about 20% nickel oxides at a pressure of 150 lbs. per sq. in. gauge and a temperature of 330° C., the hydrogen volume being measured at the pressure of the system and at atmospheric temperature. The resulting product was found to contain, per mol of xylidine, 59.1 mols of hydrogen and 2 mols of water; the dewpoint of the water in the gas was 74° C. This product was cooled to a temperature of 105° C. whereby a condensate containing 98.0% xylidine and only 0.3% water was obtained, the xylidine recovered amounting to 55.5% of the total xylidine produced.

Since certain changes may be made in the above process without departing from the scope of the invention, it is intended that all matter contained in the above description shall be interpreted as illustrative and not in a limiting sense.

We claim:

1. A process for the production of xylidine by the hydrogenation in the vapor phase of nitroxylene, which comprises hydrogenating the nitroxylene so as to convert at least 98% of the nitroxylene to the xylidine and cooling the reaction product to a temperature within the range of about 10° to about 40° C. above the dewpoint of the water in the reaction product, whereby a xylidine condensate containing less than 1% water is recovered.

2. A process for the production of xylidine by the hydrogenation in the vapor phase of nitroxylene, which comprises hydrogenating the nitroxylene so as to convert at least 98% of the nitroxylene to the xylidine and cooling the reaction product to a temperature within the range of about 30° to about 40° C. above the dewpoint of the water in the reaction product, whereby a condensate containing the bulk of the xylidine present in the reaction product and less than 1% water is recovered.

3. A process for the production of xylidine by the hydrogenation in the vapor phase of nitroxylene which comprises passing a mixture of nitroxylene and hydrogen, containing between 7 and 20 cu. ft. of hydrogen (measured at the working pressure and atmospheric temperature) per pound of nitroxylene, into contact with a catalyst at pressures between about 10 and 20 atmospheres gauge and at a temperature between about 245° and 360° C., whereby conversion of at least 98% of the nitroxylene to the xylidine takes place, cooling the reaction product to a temperature within the range of about 30° to about 40° C. above the dewpoint of the water in the reaction product, whereby a condensate containing the bulk of the xylidine present in the reaction product and less than 1% water is recovered, cooling the uncondensed gases to atmospheric temperature and recovering the remainder of the xylidine from the condensate thus formed.

AUGUSTUS S. HOUGHTON.
FORD R. LOWDERMILK.

REFERENCES CITED

The following references are of record in the file of this patent:

UNITED STATES PATENTS

| Number | Name | Date |
|---|---|---|
| 1,278,280 | Wright et al. | Sept. 10, 1918 |
| 1,418,885 | Schulze | June 6, 1922 |
| 1,735,455 | Fenhagen et al. | Nov. 12, 1929 |
| 2,292,879 | Kise | Apr. 11, 1942 |
| 2,388,160 | Krase | Oct. 30, 1945 |